(12) United States Patent
Habuta et al.

(10) Patent No.: US 8,470,514 B2
(45) Date of Patent: Jun. 25, 2013

(54) INFORMATION RECORDING MEDIUM AND METHOD FOR MANUFACTURING THE SAME

(75) Inventors: Haruhiko Habuta, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 417 days.

(21) Appl. No.: 12/593,711

(22) PCT Filed: Mar. 25, 2008

(86) PCT No.: PCT/JP2008/000707
§ 371 (c)(1),
(2), (4) Date: Nov. 5, 2009

(87) PCT Pub. No.: WO2008/129826
PCT Pub. Date: Oct. 30, 2008

(65) Prior Publication Data
US 2010/0097914 A1    Apr. 22, 2010

(30) Foreign Application Priority Data
Mar. 30, 2007   (JP) .............................. P 2007-093266

(51) Int. Cl.
*G11B 7/24*   (2006.01)
(52) U.S. Cl.
USPC ... 430/270.13; 430/945; 369/283; 369/275.2; 369/275.5
(58) Field of Classification Search
None
See application file for complete search history.

(56) References Cited

U.S. PATENT DOCUMENTS

| | | | |
|---|---|---|---|
| 4,091,171 A | | 5/1978 | Ohta et al. |
| 4,576,895 A | * | 3/1986 | Barton et al. ............ 430/270.12 |
| 4,656,079 A | | 4/1987 | Yamada et al. |
| 4,916,048 A | | 4/1990 | Yamada et al. |
| 4,935,336 A | | 6/1990 | Yamada et al. |
| 5,100,700 A | | 3/1992 | Ide et al. |
| 5,555,537 A | * | 9/1996 | Imaino et al. .................. 369/94 |
| 6,229,785 B1 | | 5/2001 | Kitaura et al. |

(Continued)

FOREIGN PATENT DOCUMENTS

| | | | |
|---|---|---|---|
| JP | 52-070809 | * | 6/1977 |
| JP | 59-185048 | | 10/1984 |

(Continued)

OTHER PUBLICATIONS

Solis et al., "Laser induced structural relaxation and crystallization phenomena in the picosecond tiome scale in GeSbO films" J. Appl. Phys., vol. 84(10) pp. 5543-5546 (Nov. 1998).*

(Continued)

*Primary Examiner* — Martin Angebranndt
(74) *Attorney, Agent, or Firm* — Wenderoth, Lind & Ponack, L.L.P.

(57) ABSTRACT

A low-cost information recording medium is provided by which good recording quality can be obtained even when information is recorded thereon in a high density using a blue laser. The recording medium has a recording layer which comprises Sb, O and M. A content of O atoms is 30 atom % or more but not more than 55 atom %, a content of M atoms is 5 atom % or more but not more than 35 atom %, and a content of Sb atoms is 20 atom % or more but not more than 55 atom %. The recording layer does not contain Au, Pt and Pd.

7 Claims, 5 Drawing Sheets

U.S. PATENT DOCUMENTS

| | | |
|---|---|---|
| 6,605,330 B2 | 8/2003 | Tyan et al. |
| 2003/0099805 A1 | 5/2003 | Tyan et al. |
| 2004/0067332 A1* | 4/2004 | Hsu et al. .................... 428/64.4 |
| 2004/0253539 A1* | 12/2004 | Uno et al. ................ 430/270.13 |
| 2007/0010082 A1* | 1/2007 | Pinnow et al. ................ 438/602 |
| 2008/0080352 A1* | 4/2008 | Kitaura et al. ................ 369/100 |

FOREIGN PATENT DOCUMENTS

| | | |
|---|---|---|
| JP | 61-2594 | 1/1986 |
| JP | 63-58636 | 3/1988 |
| JP | 63-158293 | 7/1988 |
| JP | 2-252577 | 10/1990 |
| JP | 2003-182237 | 7/2003 |
| JP | 2005-22409 | 1/2005 |
| JP | 2007-265591 | 10/2007 |
| WO | 98/09823 | 3/1998 |

OTHER PUBLICATIONS

International Search Report issued May 20, 2008 in International (PCT) Application No. PCT/JP2008/000707.

International Preliminary Report on Patentability issued Jan. 21, 2010 in International (PCT) Application No. PCT/JP2008/000707.

* cited by examiner

INFORMATION RECORDING MEDIUM AND METHOD FOR MANUFACTURING THE SAME

TECHNICAL FIELD

The present invention is related to an information recording medium on and from which information can be recorded and reproduced at a high density and a high speed using an optical means such as irradiation of laser beam, and a method for producing the same.

BACKGROUND ART

An optical information recording medium is known as the information recording medium (which may be referred to as a "recording medium" or a "medium" hereinafter) having a large capacity, on and from which information can be recorded and reproduced at a high speed. Recording information on and reproducing information from this optical information recording medium is carried out using the fact that a recording material is changed into a state which is distinguishable optically, by heat caused by irradiating the recording material with laser beam. This recording medium has an advantage that it allows random access thereto if necessary, and is excellent in portability, and therefore is of increasing importance.

The optical information recording media which have been proposed include a rewritable medium on which information can be overwritten many times and a write-once medium on which information is written only once. The write-once medium can be produced with ease and provided at a low cost since the number of layers constituting the medium is generally smaller compared to the rewritable medium. Further, the write-once medium is advantageously used for a medium in which data that a user does not want anyone to destroy or erase is written since the data cannot be overwritten. For these reasons, there is large demand for the write-once medium which has long archival life and high reliability, as a medium for archival applications. The write-once medium is used for, for example, recording and storing personal data and visual information by means of a computer, and is used widely in the medical field and the academic field. Further, the write-once medium is also used as an alternative for home video tapes.

Now the performances of the application and the visual information are higher and the market develops quickly, which requires the enhancement of the capacity of the write-once recording medium and production of the write-once recording medium at a lower cost.

The technique of enhancing the capacity of the optical information recoding medium is divided into two main classes. One is a technique for increasing the surface recording density by shortening the wavelength of a light source, increasing an NA of an objective lens, and by a superresolution recording. The other is a technique for increasing the number of recording layers in a thickness direction of the medium so as to increase the total surface recording area. Now, the capacity of the optical information recording medium is increasing by combining the both techniques.

Further, the cost per optical information recording medium depends on many production parameters such as a production apparatus, time required for producing the medium and a yield. In particular, the cost of the medium is largely affected by the cost of the material. For example, a noble metal such as Pt, Pd and Au and a rare-earth element such as Eu, Tb and Pr are known as expensive materials since prospects of them are small. Therefore, these elements are preferably avoided as the material constituting the medium in view of the cost of the medium.

The demand for the write-once medium is increasing rapidly with explosive sales of DVD recorders. This is because the usage wherein the video recorded on a hard disk is stored in the write-once recording medium becomes common. Of course, it is presumed that the same usage will be employed by end users when using the next-generation DVD recorder. Thus, the low-cost write-once recording medium having a large capacity which is suitable for recording high-definition broadcast data is receiving attention. One of such mediums is a Blu-ray Disc (BD).

Some oxide materials have been proposed as the write-once type recording material. For example, the recording material is known of which main component is $TeO_x$ that is a lower oxide of Te. In particular, it is known that a Te—O—Pd recording material of which main component is $TeO_x$ with Pd dispersed therein makes it possible to obtain large signal amplitude and to give very high reliability (see Patent Document 1). It is considered that the recording mechanism of these Te—O—Pd-based recording material is as follows: The Te—O—Pd film after the film formation is a composite material wherein Te—Pd, Te or Pd is uniformly dispersed as microparticles in $TeO_2$. When the laser beam is applied for recording, Te, Te—Pd and Pd are melted and deposited as larger crystalline particles. Thereby, the optical state is changed and the difference in optical state between the portion irradiated with the laser beam and the portion not irradiated with the laser beam can be detected as signal.

The Te—O—Pd-based recording material, however, contains Pd which is expensive as described above, as a component. For this reason, it is difficult to realize the optical information recording medium of low cost, when using this material.

The recording material of which main component is $SbO_x$ has been proposed as another oxide material (Patent Documents 2-5). It is presumed that the recording mechanism of the $SbO_x$-based recording material is the same as that of the Te—O—Pd-based material. That is, the $SbO_x$ recording material after the film formation is a composite material wherein Sb is uniformly dispersed as microparticles in amorphous Sb—O, and Sb is melted by irradiation of laser beam to be deposited as larger crystalline particles. The optical state is thereby changed such that the difference in optical state can be detected as signal.

A problem of the optical information recording medium wherein the $SbO_x$-based material is used is that a contrast ratio is small. In Patent Document 2, addition of a material such as PbO, $In_2O_5$, SnO, $B_2O_5$, CuO, $TeO_2$, SiO, $GeO_2$ is proposed for improving the contrast ratio. However, it was found that a C/N ratio is reduced and the recording and reproduction characteristics are lowered when information is recorded at a recording density higher than that employed in the experimental conditions described in Patent Document 2, according to the experiment conducted by the inventors.

In Patent Document 3, a Te—Ge—Sb—Au—O material wherein Au that is a noble metal is contained in the $SbO_x$-based material is proposed. However, the material described in this document contains gold (Au) and hence it is not suitable for reducing the cost.

Patent Document 4 reports the recording material wherein Te and Ge are added to the $SbO_x$-based material. However, the addition amounts of Te and Ge are not expressly indicated in this document. This document merely mentions that, when the content of the metal or the semi metal to be combined with $SbO_x$ is over 50 mol %, the laser power required for whitening is large and such material is not preferable in the case where the light source with small output power is employed. Further, this recording material is used for producing the rewritable medium according to this document.

In patent Document 5, a technique of adding ZnS—SiO$_2$ to an SbInSn-based material. It is found that this technique improves signal quality. However, it was found that a C/N ratio is reduced and the recording and reproduction characteristics are lowered when information is recorded at a recording density higher than that employed in the experimental conditions described in this document, according to the experiment conducted by the inventors.

[Patent Literature 1] WO1998/009823
[Patent Literature 2] Japanese Unexamined Patent Publication (kokai) S52-70809
[Patent Literature 3] Japanese Unexamined Patent Publication (kokai) S61-002594
[Patent Literature 4] Japanese Unexamined Patent Publication (kokai) S59-185048
[Patent Literature 5] Japanese Unexamined Patent Publication (kokai) 2003-182237

DISCLOSURE OF INVENTION

Problems to be Solved by Invention

The object of the present invention is to provide a low-cost write-once information recording medium and a method for producing the same, which gives good signal quality and is excellent in read stability even if the high-density recording condition which has not been realized in the conventional information recording medium is employed.

Means to Solve the Problems

In order to achieve the object, an information recording medium of the present invention is one including an information layer on a substrate, the information layer having a recording layer, on and from which information can be recorded and reproduced by irradiating the recording layer with laser beam, which medium is characterized in that the recording layer contains Sb, O and M wherein M is at least one element selected from a group consisting of Ge, Zn, Ni, Te, C and Cu, and a content of O atoms is from 20 atom % to 70 atom %, a content of M atoms is from 1 atom % to 50 atom % and a content of Sb atoms is from 10 atom % to 70 atom % when the total number of the Sb atoms, the O atoms, and the M atoms contained in the recording layer is 100 atom %, and the recording layer does not contain Au, Pt and Pd. This information recording medium can realize an information recording medium which gives a high C/N ratio, good signal quality and excellent read stability, and is of low cost since the recording layer does not contain Au, Pt and Pd.

The O atoms, the Sb atoms and the M atoms preferably occupy 80 atom % or more together of the sum of atoms constituting the recording layer, where the sum is 100 atom %. When the sum of the three types of atoms is below 80 atom %, the effect conferred by the inclusion of the O atoms, the Sb atoms and the M atoms may not be obtained. The three types of atoms more preferably occupy 90 atom % or more, and still more preferably 95 mol % or more. Or the recording layer may be formed from only the three types of atoms.

It is preferable that the element M is at least one element selected from a group consisting of Ge, Zn, Ni, Te and Cu. This is because these elements are suitable for improvement in C/N ratio and read stability.

It is more preferable that the element M is Ge. This is because this element is suitable for more improvement in C/N ratio and read stability.

Alternatively, the M element is preferably a combination of Ge and at least one element selected from a group consisting of Zn, Ni, Te, C and Cu. Such combination is suitable for improvement in C/N ratio and read stability.

A thickness of the recording layer is preferably from 2 nm to 70 nm. This is because an information recording medium with high C/N ratio can be realized when the thickness is in that range.

Further, the information layer may further include a dielectric layer. In that case, it is preferable that the dielectric layer contains at least one compound selected from a group consisting of Al$_2$O$_3$, ZnO, TiO$_2$, ZrO$_2$, SiO$_2$, Cr$_2$O$_3$, LaF$_3$, MgF$_2$, CaF$_2$, AlN, Si$_3$N$_4$, Ge$_3$N$_4$, ZnS and Sb$_2$O$_3$, and/or a mixture of ZnS and SiO$_2$. This is because a high C/N ratio can be ensured by a combination of the recording layer containing the afore-mentioned particular three types of elements and these compounds or the mixture.

The information recording medium of the present invention may be provided in an embodiment which has "n" information layers (n is an integer of 2 or more) on the substrate. In that case, at least one information layer includes the afore-mentioned information layer, that is, the information layer which has the recording layer containing Sb, O and M at particular ratios. A multi-layer construction makes it possible to increase the capacity of the recording medium.

The information recording medium of the present invention is preferably a medium on which information is recorded with laser beam having a wavelength of from 350 nm to 500 nm and from which information recorded on the information layer is reproduced with laser beam having a wavelength of from 350 nm to 500 nm. This is because such laser beam enables the information to be recorded at a high density.

The information recording medium of the present invention is preferably a medium on which information is recorded only once, that is, a write-once type medium. The afore-mentioned particular recording layer is suitable for one-time recording.

Further, the present invention provides a method for producing the information recording medium of the present invention which includes a step of forming a recording layer directly on a substrate or on another layer that is formed on the substrate, wherein the step of forming the recording layer includes forming the recording layer by a sputtering method, and:

which method is characterized in that a sputtering target used in the step of forming the recording layer contains Sb, O and M wherein M is at least one element selected from a group consisting of Ge, Zn, Ni, Te, C and Cu. This is because this production method makes it possible to produce the information recording medium having high C/N ratio and high read stability at a low cost.

Further, the present invention also provides a method for producing the information recording medium of the present invention which includes a step of forming a recording layer directly on a substrate or on another layer that is formed on the substrate, wherein the step of forming the recording layer includes forming the recording layer by a reactive sputtering method in an atmosphere containing a mixed-gas of a rare gas and oxygen, and:

which method is characterized in that a sputtering target used in the step of forming the recording layer contains Sb and M wherein M is at least one element selected from a group consisting of Ge, Zn, Ni, Te, C and Cu. This is because this production method also makes it possible to produce the information recording medium having high C/N ratio and high read stability at a low cost.

Effect of Invention

The information recording medium according to the present invention is characterized in that Sb, O and M (wherein M is at least one element selected from a group consisting of Ge, Zn, Ni, Te, C and Cu) are contained in the recording layer and the content of the O atoms is from 20 atom % to 70 atom %, the content of the M atoms is from 1 atom % to 50 atom % and the content of the Sb atoms is from 10 atom % to 70 atom % providing that the total number of the Sb atoms, the O atoms and the M atoms contained in the recording layer is 100 atom %. This characteristic makes it possible to produce the information recording medium, particularly the write-once type medium, with good signal quality and excellent read stability as described below, at low cost. Further, the information recording medium with the above-mentioned effect can be manufactured by the method for producing the information recording medium according to the present invention.

| 1, 9, 24, 44 | information recording medium |
| 2, 10, 25 | substrate |
| 4, 12, 18, 27, 32, 37 | first dielectric layer |
| 5, 13, 19, 28, 33, 38 | recording layer |
| 7, 22, 41 | optical transparent layer |
| 8, 23, 42, 45 | laser beam |
| 3, 11, 17, 26 | reflective layer |
| 6, 14, 20, 29, 34, 39 | second dielectric layer |
| 15, 30 | first information layer |
| 16, 31, 36 | intermediate layer |
| 21, 35 | second information layer |
| 40 | "n"th information layer |
| 43 | recording and reproduction apparatus |
| 46 | objective lens |
| 47 | laser |
| 48 | photodetector |
| 49 | spindle motor |

BEST MODE FOR CARRYING OUT THE INVENTION

Embodiments of the present invention are described with reference to drawings. It should be noted that the following embodiments are examples and the present invention is not restricted to the following embodiments. Further, in the following embodiments, identical parts or identical elements are denoted with identical reference numerals, and duplicate description may be omitted.

Figure 1:
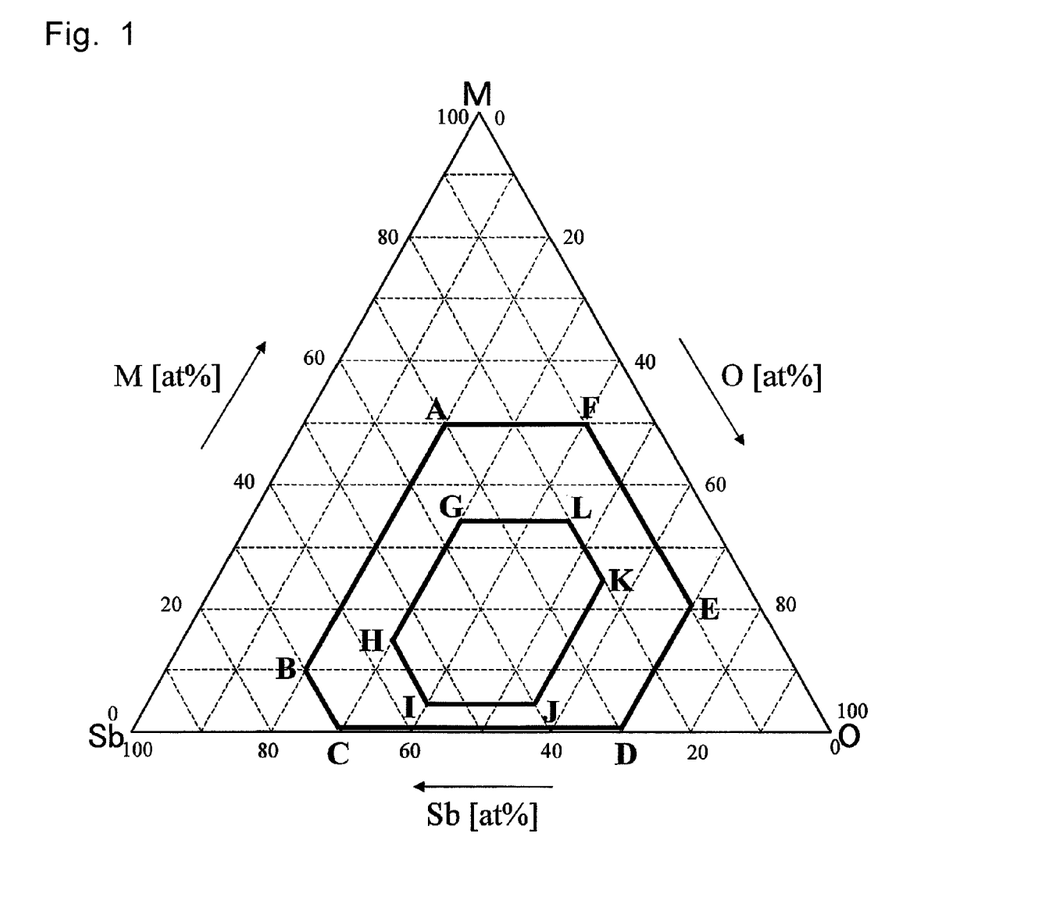
FIG. 1 shows a triangular coordinate graph of Sb—O—Ge.

FIG. 1 is a triangular coordinate graph of Sb—O—Ge. In FIG. 1, a region enclosed by ABCDEF shows a compositional range of a composition of Sb, O and M contained in a recording thin film of the information recording medium according to the present invention. How we reached the conclusion that this compositional range is optimal in order to achieve the object of the present invention is described below.

Figure 2:
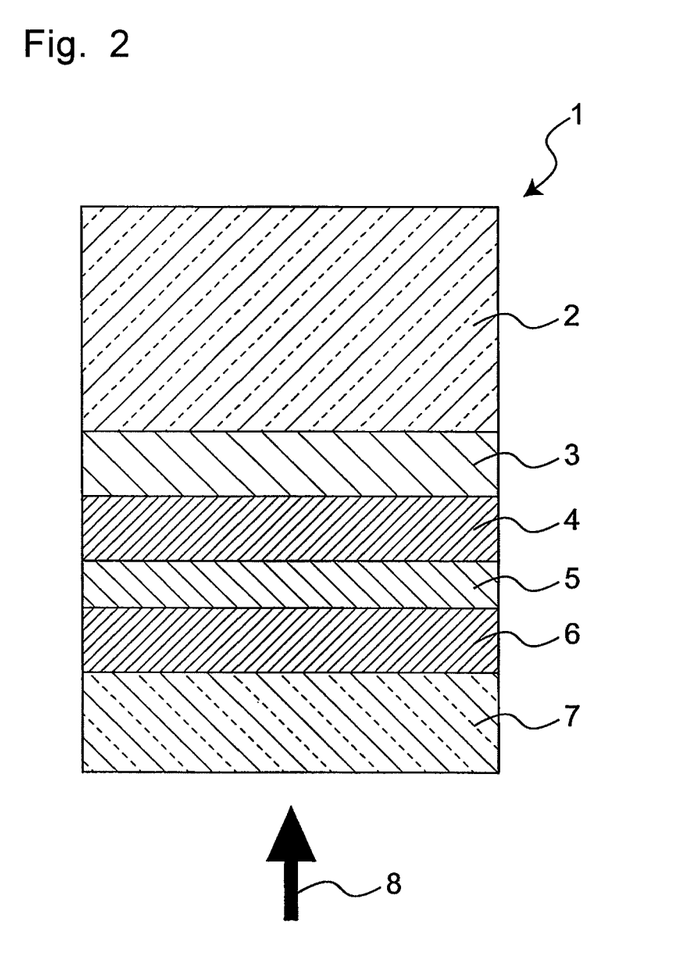
FIG. 2 shows a cross-sectional view of a constitutional example of an optical information recording medium of the present invention.
Figure 3:
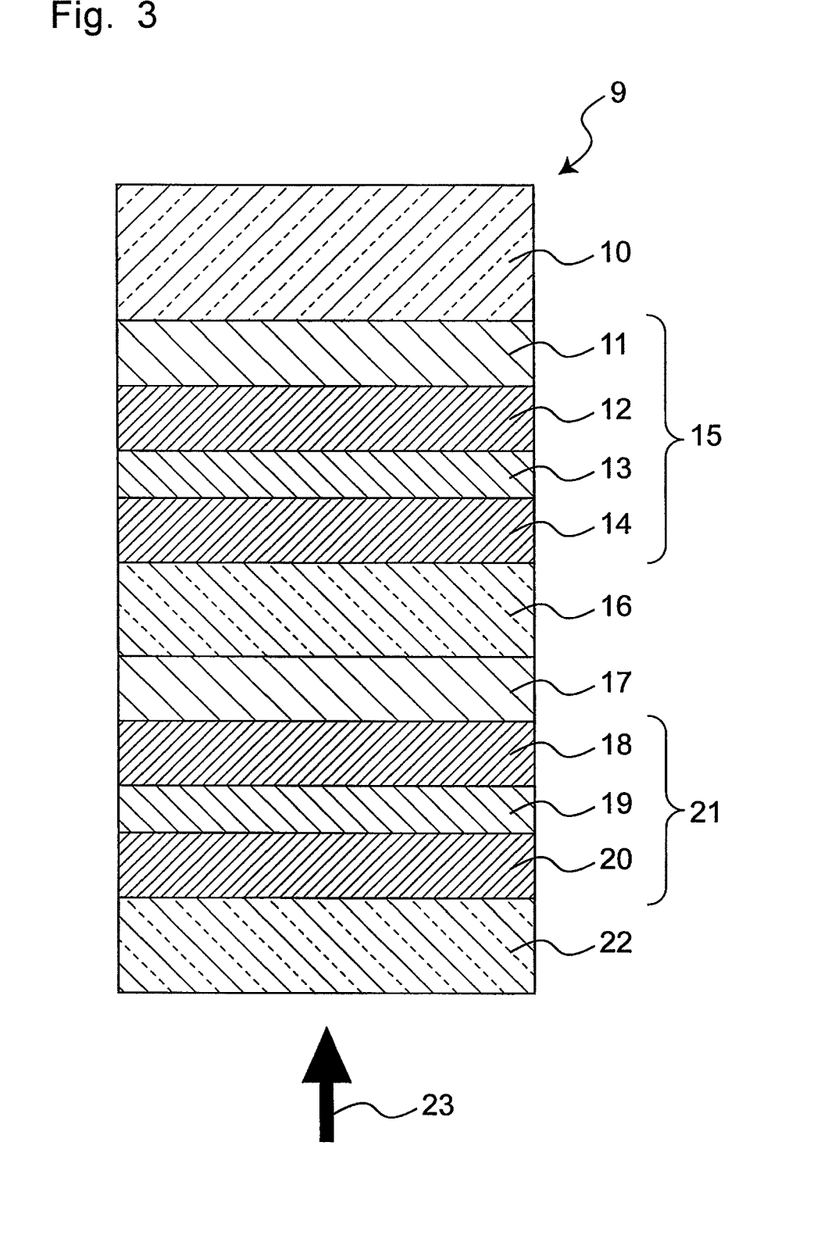
FIG. 3 shows a cross-sectional view of another constitutional example of the optical information recording medium of the present invention.
Figure 4:
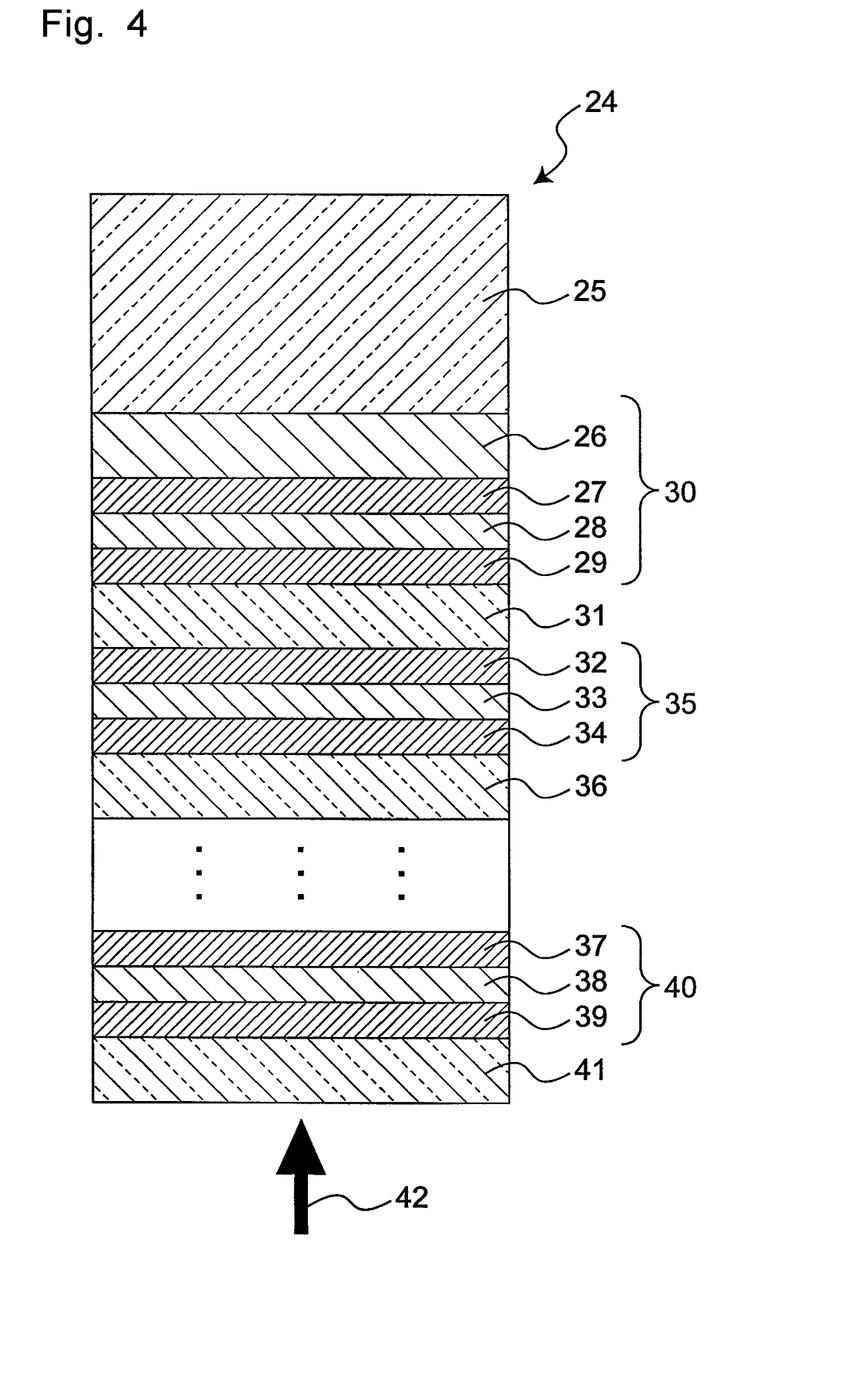
FIG. 4 shows a cross-sectional view of a still further constitutional example of the optical information recording medium of the present invention.

Each of FIGS. 2, 3 and 4 is a constitutional example of the information recording medium of the present invention.

As shown in FIG. 2, the information recording medium 1 of the present invention has a constitution wherein an information layer comprising a reflective layer 3, a first dielectric layer 4, a recording layer 5 and a second dielectric layer 6 are formed on a substrate 2. Further, an optical transparent layer 7 (which is also referred to as a cover layer or a protective layer) is further formed on the information layer in a medium of configuration shown in FIG. 2. Unless the recording characteristic and so on is affected, any or all of the reflective layer 3, the first dielectric layer 4 and the second dielectric layer 6 may not be formed. As the number of the layers is smaller, the cost can be more reduced. The recording and reproduction on this information recording medium are carried out by applying laser beam 8 from the optical transparent layer 7 side.

The information recording medium 9 shown in FIG. 3 has a constitution wherein a first information layer 15 and a second information layer 21 are formed in this order on a substrate 10. An intermediate layer 16 is disposed between the two information layers to separate optically the information layers from each other, precluding unnecessary optical interference. Further, an optical transparent layer 22 is formed on the second information layer 21. The recording and reproduction on this information recording medium is carried out by applying laser beam 23 from the optical transparent layer 22 side.

The first information layer 15 has a constitution wherein a reflective layer 11, a first dielectric layer 12, a recording layer 13 and a second dielectric layer 14 are stacked in this order in order to ensure both of high reflectance and high signal quality. The second information layer 21 comprises a reflective layer 17, a first dielectric layer 18, a recording layer 19, and a second dielectric layer 20 similarly to the first information layer. However, the thicknesses of the recording layer and the reflective layer may be smaller than those of those layers the included in the first information layer in order to establish both of high transmittance and high signal quality. Unless the recording characteristic and so on is affected, any or all of the reflective layers, the first dielectric layers and the second dielectric layers in the first and the second information layers may not be formed in order to reduce the cost.

The information recording medium 24 of the present invention shown in FIG. 4 has a constitution wherein a first information layer 30, a second information layer 35, . . . , and an "n"th information layer 40 (wherein n≧3) are provided on a substrate 25 in this order. Intermediate layers 31 and 36 are disposed between adjacent information layers to separate optically the information layers from each other, precluding unnecessary optical interference. The recording and reproduction on this information recording medium 24 is carried out by applying laser beam 42 from an optical transparent layer 41 side. The recording and reproduction on a "k"th information layer (wherein "k" is an integer of from 1 to (n−1)) is carried out by the laser beam which passes through from the "n"th information layer 40 to the "k+1"th information layer.

The first information layer 30 has a constitution wherein a reflective layer 26, a first dielectric layer 27, a recording layer 28 and a second dielectric layer 29 are stacked in this order in order to establish both of high reflectance and high signal quality. The second information layer 35 to the "n"th information layer 40 consist of first dielectric layers 32, . . . 37, recording layers 33, . . . 38 and second dielectric layers 34, . . . 39 in order to establish both of high transmittance and high signal quality. A reflective layer may be optionally inserted between the first dielectric layer and the intermediate layer in order to enhance the signal quality. Unless the recording characteristic and so on is affected, any or all of the reflective layer, the first dielectric layer, and the second dielectric layer in each information layer may not be formed in view of cost.

The recording material consisting of Sb, O and M (which is referred to as an "Sb—O-M-based material hereinafter) is contained in the recording layer 5 of the medium 1 shown in FIG. 2. The use of this recording material can realize a low-cost information recording medium (particularly a write-once medium) with good signal quality and excellent read stability. As shown in FIGS. 3 and 4, it is preferable that all of the recording layers contain the Sb—O-M-based material in the medium having a plurality of recording layers (that is, a multi-layer medium). However, the recording layer which contains the Sb—O-M-based material and the recoding layer which does not contain the Sb—O-M-based material may be present in a single medium for the purpose of adjusting the recording sensitivity of each layer in the multi-layer medium.

The substrates 2, 10 and 25 are transparent and disk-shaped. A polycarbonate resin, a polymethylmethacrylate resin, a polyolefin resin, a norbornene resin, an ultraviolet-curable resin, glass, or a combination thereof may be used as a material for the substrate. Further, the thicknesses of the substrates 2, 10 and 25 are not limited to particular ones, and may be from 0.01 mm to 1.5 mm.

The optical transparent layers 7, 22 and 41 are transparent and disk-shaped. A material which has low optical absorptance at the wavelength of the laser beams 8, 23 and 42 used and low optical birefringence in a short-wavelength region is preferably used as a material for the optical transparent layer. Specifically, a polycarbonate resin, a polymethylmethacrylate resin, a polyolefin resin, a norbornene resin, an ultraviolet-curable resin, glass, or a combination thereof may be used. Further, the thicknesses of the optical transparent layers 7, 22 and 41 are not limited to particular ones and may be from 0.01 mm to 1.5 mm.

When a numerical aperture of the objective lens used for recording and reproduction is 0.75 or more but 0.95 or less, the thicknesses of the substrates 2, 10 and 25 are preferably in a range of 1.00 mm to 1.20 mm in order to maintain the strength of the recording medium during production. Further, the thicknesses of the optical transparent layers 7, 22 and 41 are preferably in a range of 0.03 mm to 0.20 mm in order to reduce the allowable range of tilt.

On the other hand, when the numerical aperture is 0.55 or more but less than 0.75, the thicknesses of the substrates 2, 10 and 25 are preferably in a range of 0.50 mm to 0.70 mm and the thicknesses of the optical transparent layers 7, 22 and 41 are preferably in a range of 0.50 mm to 0.70 mm.

A polycarbonate resin, a polymethylmethacrylate resin, a polyolefin resin, a norbornene resin, an ultraviolet-curable resin, glass, or a combination thereof may be used as a material for the intermediate layers 16, 31 and 36, similarly to the optical transparent layer.

The thicknesses of the intermediate layers 16, 31 and 36 are required to be equal to or more than a focal depth which is determined by the numerical aperture NA of the objective lens and the wavelength λ of the laser beam so that cross talk from another information layer is reduced when information is reproduced from any one of the first information layer, the second information layer and the "n"th information layer. Further, the thicknesses of the intermediate layers 16, 31 and 36 are required to be selected so that the entire thickness is in a range such that light can be focused on all the information layers. When three or more information layers are stacked, the thicknesses of the respective intermediate layers are preferably different from each other. If the thicknesses of the intermediate layers are the same, the information layers are placed at regular intervals and the laser beam to be used for recording and reproduction on a back layer may be focused on a near-side layer which is two layers down from the back layer, which may increase the cross talk.

In a single information recording medium, pits or a guide groove for guiding the laser beam is preferably formed on the side where the information layer is positioned (that is, the side nearer to a light source of the laser beam) in any of the substrates 2, 10 and 25, the optical transparent layers 7, 22 and 41 and the intermediate layers 16, 31 and 36.

The recording layers 5, 13, 19, 28, 33 and 38 are formed from a material which can take two or more states of which optical characteristics are different. The material for the recording material of the write-once information recording medium is preferably one which can irreversibly change from a certain state to another state of which optical characteristic is different from that of the certain state.

In the present invention, a material consisting of Sb, O and M wherein M is one or more elements selected from a group consisting of Ge, Zn, Ni, Te, C and Cu) is used as a material for the recording layers 5, 13, 19, 28, and 38. In the recording layer, O forms an oxide together with Sb, does not form a compound with any element, and/or forms an oxide together with another element. Sb and M also may form a compound together with another atom, or may not combine with any atom, or may form an alloy of Sb-M.

In particular, the element M is preferably any one element selected from a group consisting of Ge, Zn, Ni, Te and Cu. This is because a sufficient crystallization rate and high read stability are achieved. It is particularly preferable that the element M is Ge. A combination of Ge and one element selected from a group consisting of Zn, Ni, Te, C and Cu is more preferable as the element M in view of the crystallization rate and the read stability.

Alternatively, the element M is preferably one which combines with Sb to form a recording mark in a stable crystalline state. One or more elements selected from a group consisting of Ge, Zn, Ni, Te, C and Cu is preferably used from this viewpoint. This is because these elements can form a compound or a eutectic together with Sb. An element other than the above-mentioned elements may be added for further improving the characteristics.

When the element such as Ge, Zn, Ni, Te, C and Cu is used as the element M, a crystallization temperature is improved and the read stability is enhanced. When the recorded signal is continuously reproduced from the information recording medium with low read stability, the signal quality is being lowered due to the crystallization of the recording layer. When the recorded signal is continuously reproduced from the information recording medium with high read stability, stable signal can be continuously reproduced.

The Sb—O-M-based material is a composite material wherein microparticles of Sb, Sb-M and M are uniformly dispersed in Sb—O (for example, $Sb_2O_3$) just after film formation. When a film of this material is irradiated with the laser beam, diameters of Sb crystallization particles and Sb-M crystallization particles becomes large, whereby the optical state is changed. In the recording layer containing the Sb—O-M-based material, the difference in optical state between the portion of which optical state is changed by the application of laser beam and the portion where the laser beam is not applied can be detected as signal. Further, the change in optical state of the recording layer formed from the material containing Sb, O and M at the above-mentioned particular ratio is irreversible. Therefore, the present invention can be realized as a medium on which only once writing can be made, that is, the write-once recording medium.

The Sb—O-M-based material contained in the recording layer 5, 13, 19, 28, 33 and 38 is preferably contained in an amount of 80% or more when the number of the atoms constituting the recording layer is 100 atom %. This is because the effect given by the inclusion of Sb, O and M is exerted. Further, the recording layer has a composition wherein the content of the O atoms is 20 atom % or more but 70 atom % or less, the content of the M atoms is 1 atom % or more but 50 atom % or less and the content of the Sb atoms is 10 atom % or more but 70 atom % or less when the total number of the Sb atoms, the O atoms and the M atoms are 100 atom %. The Sb—O-M-based material more preferably has a composition wherein the content of the O atoms is 30 atom % or more but 55 atom % or less, the content of the M atoms is 5 atom % or more but 35 atom % or less, and the content of the Sb atoms is 20 atom % or more but 55 atom % or less. The reason why this composition is preferable is described below.

When the content of the Sb atoms is less than 10 atom % in the recording layers 5, 13, 19, 28, 33 and 38 based on the sum of the Sb atoms, the O atoms and the M atoms where the sum is 100 atom %, the change in reflectance between amorphous and crystal is small, resulting in small C/N ratio. On the other hand, when the content of Sb exceeds 70 atom %, the recording mark tends to deteriorate by the reproducing light after the signal is recorded. When the content of the Sb atoms is 20 atom % or more but not more than 55 atom %, the optical change of the recording layer is large, and thereby better C/N ratio can be ensured.

When the content of the O atoms is less than 20 atom % in the recording layers 5, 13, 19, 28, 33 and 38 based on the sum of the Sb atoms, the O atoms and the M atoms where the sum is 100 atom %, the thermal conductivity of the recording layer is too high, whereby in-plane thermal diffusion is large, resulting in failure to achieve a high C/N ratio even if a recording power is increased. On the other hand, when the content of the O atoms exceeds 70 atom %, the thermal conductivity of the recording layer is too low to make the recording mark large even if the recording power is increased, resulting in a low C/N ratio and deterioration of sensitivity. When the content of the O atoms is 30 atom % or more but not more than 55 atom %, the thermal conductivity of the recording layer is appropriately reduced and the in-plane thermal diffusion is reduced, and thereby better C/N ratio can be ensured.

When the content of the M atoms is less than 1 atom % in the recording layers 5, 13, 19, 28, 33 and 38 based on the sum of the Sb atoms, the O atoms and the M atoms where the sum is 100 atom %, the recording mark tends to be deteriorated by the reproducing light after the signal is recorded. When the content of the M atoms exceeds 50 atom %, the change in reflectance between the amorphous and the crystal is reduced and thereby the C/N ratio is reduced. When the content of the M atoms is 5 atom % or more but not more than 35 atom %, the optical change of the recording layer is made large by the application of laser beam, and thereby better C/N ratio can be ensured.

The Sb atom, the O atom, and the M atom may be present in any form in the recording layer. For example, a part or all of the Sb atoms may form an alloy together with the M atom. A part or all of the O atoms may form an oxide together with Sb and/or M. The O atom may form the oxide together with Sb and M at a stoichiometric ratio, or may form a lower oxide. A part of the O atoms may be present without being bound to any atom. Further, the O atoms may be contained with a content exceeding the stoichiometric ratio.

The atom of which content is the highest is any of these three types of atoms as long as the contents of the Sb atoms, the O atoms and the M atoms are within the above-mentioned ranges. For example, the content of the M atoms may be the highest. Or the content of the O atoms may be the highest.

The thicknesses of the recording layers 5, 13, 19, 28, 33 and 38 are preferably from 2 nm to 70 nm. This is because the thickness of 2 nm or more facilitates the formation of a continuous layer of the recording material (that is, the island structure is difficult to be formed), resulting in sufficient C/N ratio. Further, when the thickness exceeds 70 nm, the C/N ratio is reduced because the in-plane thermal diffusion in the recording layer is increased. The information layer 21 which is positioned on the laser-entry side in the information recording medium having two information layers as shown in FIG. 3 is required to have a high transmittance, and therefore the thickness of the recording layer in that information layer is preferably from 2 nm to 30 nm. Further, the information layers (for example, the second information layer 35, the "n"th information layer 40 in FIG. 4) which are positioned on the laser-entry side in the multi-layer information recording medium as shown in FIG. 4 are required to have a high transmittance, and therefore the thickness of the recording layers in those information layers are preferably from 2 nm to 15 nm.

Further, the recording layers 5, 13, 19, 28, 33 and 38 may have a constitution wherein a film of which main component is Sb—O (Sb and O occupy 80% of the total atoms constituting the film) and a film of which main component is M (M occupies 80% of the total atoms constituting the film) are alternately stacked. In this case, the mixing ratio of Sb—O and M can be easily adjusted by fine-adjusting the thickness of each layer, although the number of steps for forming the recording layers is increased. Therefore, such a laminate constitution may be employed if necessary.

An element other than Sb, O and M may be contained in the recording layers 5, 13, 19, 28, 33 and 38. For example, at least one element selected from a group consisting of S, N, F and B may be added for the purpose of adjusting the thermal conductivity and an optical constant, or improving the thermal durability and environmental reliability. These additional elements preferably occupy 20% or less of the total atoms constituting the recording layer.

The main purposes of providing the first dielectric layers 4, 12, 18, 27, 32 and 37 and the second dielectric layers 6, 14, 20, 29, 34 and 39 are protection of the recording material, and adjustment of the optical characteristic so as to enable the effective optical absorption in the information layer. In the first dielectric layer and the second dielectric layer, a material is used whose main component is a sulfide such as ZnS; a selenide such as ZnSe; an oxide such as $SiO_2$, $Al_2O_3$, $TiO_2$, $Ta_2O_5$, $ZrO_2$, $Cr_2O_3$, ZnO and $Sb_2O_3$; a nitride such as $Ge_3N_4$, CrN, $Si_3N_4$, AlN, NbN, MoN, TiN, ZrN and TaN; a nitride oxide such as Ge—O—N, Cr—O—N, Si—O—N, Al—O—N, Nb—O—N, Mo—O—N, Ti—O—N, Zr—O—N and Ta—O—N; a carbide such as SiC; a fluoride such as $AlF_3$, $CaF_2$, $LaF_3$ and $MgF_2$; and a combination thereof (for example, ZnS—$SiO_2$).

It is preferable to form the dielectric layer so that it contains $Al_2O_3$, ZnO, $TiO_2$, $ZrO_2$, $SiO_2$, $Cr_2O_3$, $LaF_3$, $MgF_2$, $CaF_2$, AlN, $Si_3N_4$, $Ge_3N_4$, ZnS, ZnS—$SiO_2$ or $Sb_2O_3$ as a main component in order to obtain sufficient C/N ratio. It is preferable to form the dielectric layer so that it contains $Sb_2O_3$ as a main component in order to obtain high reliability. This is because the adhesiveness of the Sb—O-M-based material to $Sb_2O_3$ is good.

The thickness of the first dielectric layer and the thickness of the second dielectric layer are preferably from 1 nm to 60 nm. This is because the sufficient C/N ratio is thereby easily obtained.

The reflective layers 3, 11, 17 and 26 are provided so as to obtain the heat dissipation effect and the optical effect which enables the effective optical absorption in the recording layer. A metal such as Au, Ag, Cu, Al, Ni, Cr and Ti or an alloy of two or more metals selected from these metals is used as a material for the reflective layer. In particular, an Ag alloy or an Al alloy is preferably used. Particularly, an Ag—Pd—Cu alloy, an Ag—Ga—Cu alloy, an Al—Cr alloy, or an Al—Ni alloy is preferably used in view of heat dissipation and humidity resistance.

The thickness of the reflective layer is preferably 1 nm or more. When the thicknesses of the reflective layers 3, 11, 17 and 26 are less than 1 nm, the reflective layer does not become a uniform layer, resulting in failure to obtain sufficient thermal and optical effects.

The present invention is not limited to the information recording mediums 1 as shown in FIGS. 2, 3 and 4 and can be applied to many constitutions. For example, the reflective layers 3, 11, 17 and 26 may not be formed, or the first dielectric layers 4, 12, 18, 27, 32 and 37 or the second dielectric layers 6, 14, 20, 29, 34 and 39 may not be formed for reducing cost in the information recording mediums shown in the drawings, where appropriate.

For example, in the recording medium shown in FIG. 3 wherein both of the first information layer 15 and the second information layer 21 have the reflective layers, either information layer may be of constitution which does not have the reflective layer for the purpose of reducing the cost and/or enhancing the transmittance. In the information recording medium shown in FIG. 4 wherein only the first information layer 30 has the reflective layer 26, the second information layer 35 to the "n"th information layer 40 also have the reflective layers. Alternatively, a constitution wherein the first information layer 30 does not have the reflective layer 26 may be employed.

In general, when the reflective layer is provided, high signal quality can easily obtained due to the heat dissipation effect and the optical effect, although the transmittance of the information layer is reduced. For this reason, it is necessary to determine appropriately whether or not the reflective layer is provided in the second information layer 21 in FIG. 3 and the second information layer 35 to the "n"th information layer 40 in FIG. 4, which are positioned on the laser light-entry side. When the reflective layer is provided, it is necessary to design the reflective layer so that it is very thin (for example, 10 nm or less) to maintain the high transmittance of the information layer. The preferable ranges of the refractive index n and the extinction coefficient k of the reflective layer are less than 2.0 and 2.0 or more, respectively.

Each layer constituting the information layers may be formed by a vapor thin-film deposition method such as a vacuum deposition method, a sputtering method, an ionplating method, a CVD (Chemical Vapor Deposition) method, an MBE (Molecular Beam Epitaxy) method.

Next, a method for producing the information recording medium of the present invention is described. For example, the medium 1 shone in FIG. 2 may be produced by a method wherein the reflective layer 3, the first dielectric layer 4, the recording layer 5 and the second dielectric layer 6 are formed in the stated order on the substrate 2, and then the optical transparent layer 7 is formed thereon. The optical transparent layer 7 may be formed by bonding a laminate wherein the layers up to the second dielectric layer 6 are formed to a substrate which has an adhesive resin on one surface. Alternatively, the medium 1 may be formed by bonding the laminate wherein the layers up to the second dielectric layer 6 are formed to a sheet-like substrate using an ultraviolet-curable resin (for example, an acrylic resin or an epoxy resin). Alternatively, the medium 1 may be formed by a method wherein the ultraviolet-curable resin is applied to the laminate wherein the layers up to the second dielectric layer 6 are formed and then the resin is cured.

Similarly, the recording mediums shown in FIGS. 3 and 4 can be manufactured by carrying out the step of forming the films, the step of forming the intermediate layer and the step of forming the optical transparent layer. The intermediate layer can be formed by applying the ultraviolet-curable resin by a spin coat method followed by curing the resin. Alternatively, the intermediate layer may be formed by a method wherein the sheet-like substrate is bonded.

The recording layer is preferably formed by the sputtering method. The sputtering method is preferably carried out according to any one of the following three processes.

In the first process, the sputtering is carried out in an atmosphere containing a rare gas using a sputtering target containing Sb, O and M wherein M is at least one element selected from a group consisting of Ge, Zn, Ni, Te, C and Cu. This sputtering process is one wherein a sputtering target is used of which composition is the identical or similar to that of the Sb—O-M-based material to be contained in the recording layer. Sb, O and M are preferably contained in the sputtering target such that the total content of these three types of atoms is 80 atom % or more when the total number of atoms constituting the sputtering target is 100 atom %.

In the second process, the sputtering is carried out in an atmosphere containing a mixed gas of the rare gas and oxygen using a sputtering target which contains Sb and M (wherein M is at least one element selected from a group consisting of Ge, Zn, Ni, Te, C and Cu), preferably in an amount of 80 atom % or more in total. Therefore, a reactive sputtering is conducted in the second process. In the film formed by this sputtering process, oxygen is supplied from the atmosphere gas. The atmosphere gas preferably contains a mixed gas of the rare gas and oxygen in an amount of 80% by volume or more. The content of oxygen contained in the recording layer can be adjusted by adjusting the ratio of the oxygen gas. The atmosphere gas may contain the oxygen gas in an amount of, for example, from 0.1% to 70% by volume.

In the third process, the recording layer may be formed from Sb-M (wherein M is at least one element selected from a group consisting of Ge, Zn, Ni, Te, C and Cu) and Sb—O by sputtering targets whose compositions are different at the same time. The low-cost write-once information recording medium which has good signal quality and excellent read stability can be realized by carrying out the film formation according to any one of these processes.

Next, an example of a recording and reproduction method for the information recording medium of the present invention is described.

Figure 5:
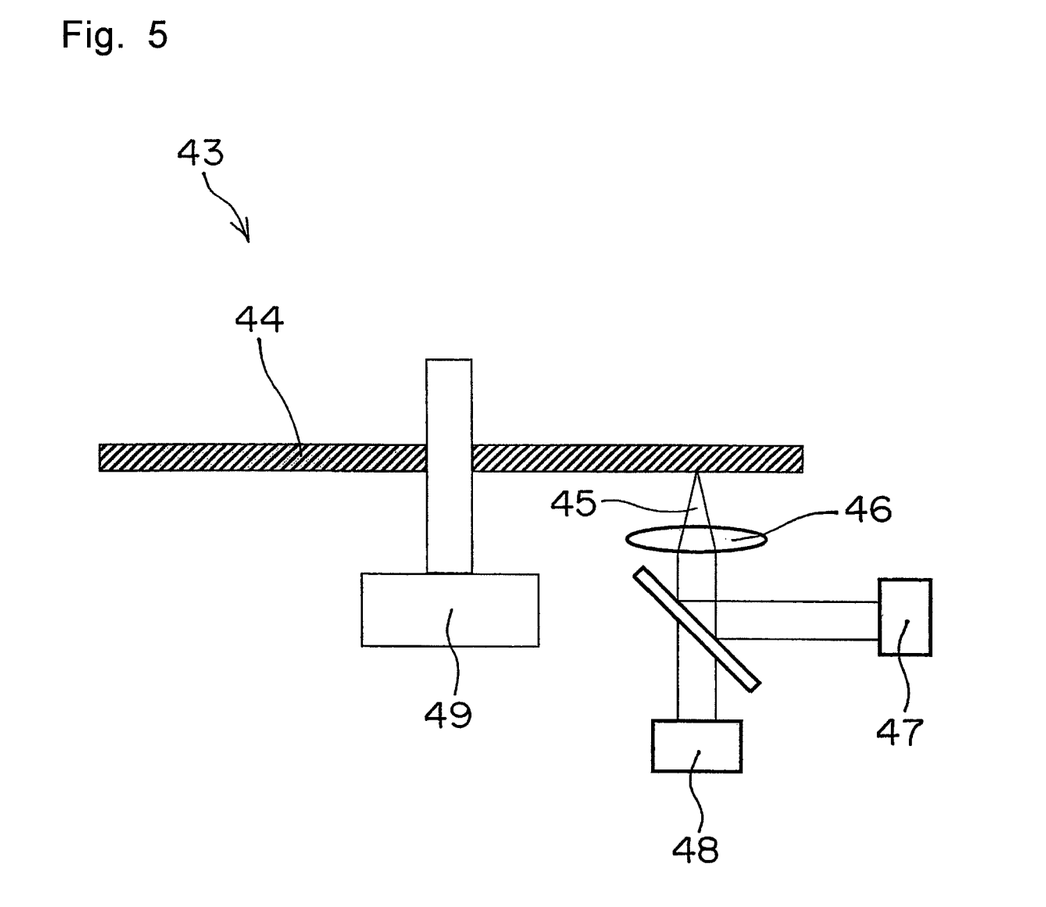
FIG. 5 schematically shows a part of a constitution of a recording and reproduction apparatus used for recording and reproduction on the optical information recording medium of the present invention.

In FIG. 5, an example of an apparatus used for recording and reproduction on a disc-shaped optical information recording medium (optical disc) is schematically shown. For recording and reproducing signal, an apparatus is used which is provided with an optical head (not shown) equipped with an objective lens 46 which focuses laser beam 45 and a laser 47, a drive (not shown) which guides a position where the laser beam is applied, to a predetermined position, a focusing controlling unit (not shown) and a tracking controlling unit (not shown) for controlling the position in a track direction and a direction vertical to a film surface, a laser drive (not shown) for modulating laser power and a spindle motor for rotating the medium.

The recording of signal is carried out by rotating the medium with the spindle motor 49, narrowing the laser beam to a micro spot by means of the optical system and irradiating the medium with the laser beam. The reproduction of signal is carried out by applying the laser beam and reading the signal from the medium by means of a photodetector 48. The power level used for reproduction of signal is lower than that used for recording of signal, and is selected so that the laser irradiation with that power level does not affect the optical state of the recording mark and gives a sufficient amount of light from the medium to reproduce the recording mark.

The wavelength of the laser light used for recording and reproduction is preferably from 350 nm or more but 500 nm or less. For example, the use of the laser light having a wavelength of 405 nm and a lens having a NA of 0.85 can realize high-density recording of 25 GB per layer in the information recording medium having a diameter of 12 cm. The use of the laser light having a wavelength of 405 nm and a lens having a NA of 0.65 can realize high-density recording of 15 GB per layer in the information recording medium having a diameter of 12 cm.

EXAMPLES

Next, the present invention is described in detail by examples.

Example 1

In Example 1, the effect on the C/N ratio and the read stability by the composition of the recording layer was investigated when the Sb—O—Ge-based material was used as the recording material. A plurality of information recording mediums (optical discs) wherein the recording layers have different compositions were manufactured as samples and evaluated. The details are described below.

In this example, the information recording medium 1 having the layer constitution shown in FIG. 2 was manufactured. A substrate of a polycarbonate resin was used as the substrate 2. The substrate 2 had a diameter of 12 cm, and a thickness of 1.1 mm, and a guide groove on one surface. The guide groove had a groove pitch of 0.32 µm and a groove depth of 20 nm.

An Al—Ni reflective layer 3 having a thickness of 80 nm was formed by sputtering using an Al—Ni (atomic ratio 96.0: 4.0) target on the surface of the substrate 2 where the groove was formed. Then, a ZnS—SiO$_2$ dielectric layer 4 was formed on the reflective layer 3 using a ZnS—SiO$_2$ (molar ratio 80:20) target. The thickness of the dielectric layer 4 varied from sample to sample, and was selected so that the reflectance which enabled the recording and reproduction to be carried out stably depending on the composition of the recording layer was ensured and the contrast was maximized. Next, the recording layer 5 of an Sb—O—Ge-based material having a thickness of 20 nm was formed using a target of Sb—Ge. Next, an AlN dielectric layer 6 (thickness varying from sample to sample) was formed by the sputtering method using an AlN target. The thickness of the dielectric layer 6 varied from sample to sample, and was selected so that the dielectric layer had appropriate refractive index and extinction coefficient depending on the thickness of the recording layer.

In the film formation of each layer, a sputtering target having a diameter of 100 mm and a thickness of 6 mm was used. A power source and an output used in the film-formation step of each layer were a DC power source and 350 W for the reflective layer, an RF power source and 300 W for the first dielectric layer 4, and the RF power source and 50 W for the recording layer 5. Further, the film formations of the reflective layer 6 and the ZnS—SiO$_2$ dielectric layer 4 were carried out in a gas atmosphere of Ar 25 sccm, keeping a gas pressure at about 0.13 Pa. The film formation of the recording layer 5 was carried out in a mixed-gas atmosphere of Ar 25 sccm and oxygen, keeping the gas pressure at about 0.13 Pa. The film formation of the AlN dielectric layer 6 was carried out in a mixed-gas atmosphere of Ar 25 sccm and nitrogen, keeping the gas pressure at about 0.13 Pa. An ultraviolet-curable resin (an acrylic resin) which is transparent to the laser beam was applied to the surface of the dielectric layer 6 by a spin coat method and was cured by being irradiated with ultraviolet ray, resulting in the formation of the optical transparent layer 7 having a thickness of 100 µm. The recording layers were formed using a plurality of sputtering targets which consisted of Sb and the element M and had different contents of these elements, and varying the amount of oxygen supply, so that the layers having the compositions shown in Table 1 were obtained. Sixteen types of the information recording mediums with recording layers of different compositions were thereby manufactured. Thus, the manufacturing of the information recording medium 1 was completed.

Next, the evaluation method of the information recording medium is described. The C/N ratio of the information recording medium 1 was evaluated by a single signal with a mark length of 2T. In order to record information on the information recording medium 1, an information recording system of general constitution was used, which was equipped with a spindle motor 49 for rotating the information recording medium 1, an optical head equipped with a semiconductor laser 47 which emits the laser light 45, and an objective lens 46 which focuses the laser light 45 on the recording layer of the information recording medium 1. In the evaluation of the recorded signal, the C/N ratio of the single signal was evaluated with a spectrum analyzer and a jitter value was evaluated with a time interval analyzer. In the evaluation of the information recording medium 1, a semiconductor laser having a wavelength of 405 nm and an objective lens having a numerical aperture of 0.85 were used and 25 GB recording was made. The linear velocity at which the information recording medium was rotated was 19.68 m/s (144 Mbps, corresponding to BD 4× (4-fold) speed).

The C/N ratio was evaluated according to the following procedures. The laser light is applied to the information recording medium 1 with the power modulating between a peak power of a high power level and a bias power of a low power level, and the single signal of 2T was recorded once onto the groove surface. The signal was recorded with the ratio of the bias power to the peak power being fixed, while the peak power was varied, and the C/N ratio was determined. The recording and the determination of C/N ratio were repeated until the maximum C/N ratio was obtained. The maximum C/N ratio was evaluated as the C/N ratio of the medium. The spectrum analyzer was used for determining the C/N ratio. Here, when the C/N ratio of more than 43 dB was obtained, it was evaluated as "⊚" because very good signal quality could be obtained; when the C/N ratio of from 40 dB to 43 dB was obtained, it was evaluated as "○" because good signal quality could be obtained; when the C/N ratio of less than 40 dB was obtained, it was evaluated as "x" because the signal quality was not good.

The read stability was evaluated according to the following procedures. Here, random signals having mark lengths of 2T to 8T were recorded once on the groove surface of the recording layer using the above-mentioned system, and an average jitter was determined. The average jitter was determined on each recording condition with the ratio of the bias power to the peak power being fixed while the peak power was varied. The peak power at which the average jitter value was minimal was thereby determined. Next, a track where data was recorded using the peak power at which the jitter value was minimal was exposed to a reproduction light continuously until the medium was rotated one million times in the condition of BD 1x-speed and reproduction light of 0.35 mW. After the read stability test, the jitter value of the track where the signal was recorded was determined. Here, when the deterioration of jitter is 0.2% or less, it was evaluated as "○"; when the deterioration of jitter was over 0.2%, it was evaluated as "x." The recording was carried out at 4x-speed (144 Mbps).

In comprehensive evaluation, a medium that was evaluated as "◎" for one or two of the evaluation items was evaluated as "◎", a medium that was evaluated as "○" for two evaluation items was evaluated as "○", and a medium that was evaluated as "x" for one or two of the evaluation items was evaluated as "x."

Next, a method for determining the content of each atom in the recording layer is described. The contents of the elements constituting the recording layer of the information recording medium were determined with a sample manufactured for analyzing the composition. Specifically, a plurality of sputtering targets with different contents of Sb and the element M used for forming the recording layer of the medium were prepared and a film having a thickness of 500 nm was formed on an Si substrate having a thickness of 1 mm using a sputtering apparatus. The film-forming conditions were the same as those employed in forming recording layer of each medium. Next, the compositional analysis was conducted for each film using an X-ray microanalyzer. The material compositions shown in Examples were the results of the analysis according to this method.

The above-mentioned evaluation was made for the information recording mediums manufactured in Example 1. The results are shown in Table 1.

TABLE 1

| Disc | Composition of Recording Layer [at %] | | | C/N ratio | Reproduction Duration | Comprehensive Evaluation |
|---|---|---|---|---|---|---|
| | Sb | O | Ge | | | |
| 1 | 15 | 30 | 55 | X | ○ | X |
| 2 | 50 | 10 | 40 | X | ○ | X |
| 3 | 30 | 30 | 40 | ○ | ○ | ○ |
| 4 | 20 | 40 | 40 | ○ | ○ | ○ |
| 5 | 5 | 55 | 40 | X | ○ | X |
| 6 | 35 | 35 | 30 | ◎ | ○ | ◎ |
| 7 | 25 | 45 | 30 | ◎ | ○ | ◎ |
| 8 | 38 | 42 | 20 | ◎ | ○ | ◎ |
| 9 | 50 | 40 | 10 | ◎ | ○ | ◎ |
| 10 | 40 | 50 | 10 | ◎ | ○ | ◎ |
| 11 | 80 | 10 | 10 | X | X | X |
| 12 | 60 | 30 | 10 | ○ | ○ | ○ |
| 13 | 30 | 60 | 10 | ○ | ○ | ○ |
| 14 | 15 | 75 | 10 | X | ○ | X |
| 15 | 70 | 30 | 0 | ○ | X | X |
| 16 | 40 | 60 | 0 | ○ | X | X |
| 17 | 20 | 30 | 50 | ○ | ○ | ○ |
| 18 | 50 | 20 | 30 | ○ | ○ | ○ |
| 19 | 70 | 25 | 5 | ○ | ○ | ○ |
| 20 | 49.5 | 49.5 | 1 | ○ | ○ | ○ |
| 21 | 20 | 70 | 10 | ○ | ○ | ○ |
| 22 | 10 | 55 | 35 | ○ | ○ | ○ |
| 23 | 27.5 | 37.5 | 35 | ◎ | ○ | ◎ |
| 24 | 45 | 30 | 25 | ◎ | ○ | ◎ |
| 25 | 55 | 35 | 10 | ◎ | ○ | ◎ |
| 26 | 47.5 | 47.5 | 5 | ◎ | ○ | ◎ |
| 27 | 30 | 55 | 15 | ◎ | ○ | ◎ |
| 28 | 20 | 55 | 25 | ◎ | ○ | ◎ |

As shown in Table 1, the results of the evaluation of the C/N ratio and the read stability of the information recording medium wherein the recording layer was formed from the Sb—O—Ge-based material varied with the composition of the recording layer. According to Table 1, when the amount of Sb in the recording layer is less than 10 atom %, the change in reflectance between amorphous and crystal is small due to the small amount of Sb, and the C/N ratio is small, which causes a problem in practical use. Further, when the amount of Sb is over 70 atom % in the recording layer, the crystallization temperature of the recording layer is low and the recording mark after the signal is recorded tends to be deteriorated by the reproduction light, which causes the problem in practical use.

When the amount of O is less than 20 atom %, the thermal conductivity of the recording layer is too high due to the small amount of O, and therefore the in-plane thermal diffusion is large. For this reason, the C/N ratio is not high even if the recording power is increased, which causes the problem in practical use. When the amount of O is over 70 atom % in the recording layer, the thermal conductivity of the recording layer is too low due to the large amount of O in the recording layer, and therefore the recording mark does not become large sufficiently. For this reason, the C/N ratio is low, which causes the problem in practical use.

When the amount of Ge in the recording layer is less than 1 atom %, Sb and O are dominant in the composition. As a result, the recorded signal deteriorate during reproduction, which causes the problem in practical use. When the amount of Ge is over 50 atom %, the change in reflectance between amorphous and crystal is small and therefore the C/N ratio is reduced, which causes the problem in practical use.

Therefore, it is considered that the composition which has a compositional range wherein a proportion of the Sb atoms is 10 atom % or more but not more than 70 atom %, the proportion of the O atoms is 20 atom % or more but not more than 70 atom % and the proportion of the Ge atoms is 1 atom % or more but not more than 50 atom % is suitable for the recording layer in view of the C/N ratio, and the read stability. This range is shown in FIG. 1 as a region enclosed by A, B, C, D, E and F.

Further, the composition in the region enclosed by A, B, C, D, E and F which has a compositional range wherein the proportion of the Sb atoms is from 20 atom % to 55 atom %, the proportion of the O atoms is from 30 atom % to 55 atom %, and the proportion of the Ge atoms is from 5 atom % to 35 atom % is more preferable as the material of the recording layer since it ensures very good C/N ratio. This range is shown in FIG. 1 as a region enclosed by G, H, I, J, K and L.

According to this embodiment, it was confirmed that the information recording medium with good signal quality could be realized by selecting the Sb—O-M-based material wherein the content of the Sb atoms was between 10 atom % and 70 atom %, the content of the O atoms was between 20 atom % and 70 atom %, and the content of the Ge atoms was between 1 atom % and 50 atom %. Further, it was confirmed that the information recording medium with very good signal quality could be realized by selecting the material wherein the content of the Sb atoms was between 20 atom % and 55 atom %, the content of the O atoms was between 30 atom % and 55 atom % and the content of the Ge atoms was between 5 atom % and 35 atom %.

Example 2

In Example 2, the C/N ratio and the read stability of the recording mediums (discs) were evaluated wherein the recording layers were formed from an Sb—O—Zn-based material, an Sb—O—Ni-based material, an Sb—O—Te-based material, an Sb—O—C-based material, an Sb—O—Cu-based material, an Sb—O—Ge—Zn-based material, an Sb—O—Ge—Ni-based material, an Sb—O—Ge—Te-based material, an Sb—O—Ge—C-based material and an Sb—O—Ge—Cu-based material as the recording material. The compositions of the recording layers were Sb:O:M=50:40:10 in the case of ternary system, and Sb:O:M1:M2=45:35:10:10 in the case of quarternary system. The film constitution of the sample (which differs from Example 1 only in the composition of the recording layer), the film-formation conditions for each layer, and the method for evaluation the disc were as described in relation to Example 1. The evaluation results of the discs are shown in Table 2.

TABLE 2

| Disc | Composition of Recording Layer [at %] | C/N ratio | Reproduction Duration | Comprehensive Eval. |
|------|---------------------------------------|-----------|----------------------|---------------------|
| 29 | Sb:O:Zn = 50:40:10 | ◎ | ○ | ◎ |
| 30 | Sb:O:Ni = 50:40:10 | ◎ | ○ | ◎ |
| 31 | Sb:O:Te = 50:40:10 | ◎ | ○ | ◎ |
| 32 | Sb:O:C = 50:40:10 | ◎ | ○ | ◎ |
| 33 | Sb:O:Cu = 50:40:10 | ◎ | ○ | ◎ |
| 34 | Sb:O:Ge:Zn = 45:35:10:10 | ◎ | ○ | ◎ |
| 35 | Sb:O:Ge:Ni = 45:35:10:10 | ◎ | ○ | ◎ |
| 36 | Sb:O:Ge:Te = 45:35:10:10 | ◎ | ○ | ◎ |
| 37 | Sb:O:Ge:C = 45:35:10:10 | ◎ | ○ | ◎ |
| 38 | Sb:O:Ge:Cu = 45:35:10:10 | ◎ | ○ | ◎ |

As shown in Table 2, when the Sb—O—Zn-based material, the Sb—O—Ni-based material, the Sb—O—Te-based material, the Sb—O—C-based material, the Sb—O—Cu-based material, the Sb—O—Ge—Zn-based material, the Sb—O—Ge—Ni-based material, the Sb—O—Ge—Te-based material, the Sb—O—Ge—C-based material and the Sb—O—Ge—Cu-based material were used as the recording material, good C/N ratio and good read stability were achieved similarly to the case where the Sb—O—Ge-based material was used.

It was confirmed, from this example, that the information recording medium with good signal quality was realized when Zn, Ni, Te, C and Cu were used as an additive to $SbO_x$ or when Ge and Zn; Ge and Ni; Ge and Te; Ge and C; and Ge and Cu were used as the additive to $SbO_x$.

Example 3

In Example 3, the recording layers of an information recording medium having two information layers were constituted from the Sb—O-M-based material (here, an Sb—O—Ge-based material was used as a representative example) and the effect of the composition of the recording layer on the C/N ratio and the read stability of the recording medium (optical disc) was investigated, similarly to Example 1.

The information recording medium shown in FIG. 3 was manufactured. A substrate of a polycarbonate resin was used as the substrate 10. The substrate had a diameter of 12 cm and a thickness of 1.1 mm and a guide groove on one surface. The guide groove had a groove pitch of 0.32 μm and a groove depth of 20 nm.

A first information layer 15 was formed on the surface of the substrate 10 where the groove was formed. The first information layer 15 had a constitution having a reflective layer 14, a first dielectric layer 12, a recording layer 13 and a second dielectric layer 14. An Al—Ni reflective layer having a thickness of 80 nm was formed by a sputtering method using an Al—Ni (atomic ratio 96.0:4.0) target. Next, a $ZnS$—$SiO_2$ dielectric layer 12 having a thickness of 30 nm was formed by the sputtering method using a $ZnS$—$SiO_2$ (molar ratio 80:20) target. Next, the recording layer 13 of the Sb—O—Ge-based material having a thickness of 20 nm was formed by the sputtering method using a target of Sb—Ge. Next, an Al—N dielectric layer 14 having a thickness of 20 nm was formed by the sputtering method using an AlN target.

An ultraviolet-curable resin (an acrylic resin) was applied to the surface of this first information layer by a spin coat method. Next, a plate wherein convexes and concavities complementary to the guide groove formed on the substrate 10 were formed was adhered to the ultraviolet-curable resin.

The ultraviolet-curable resin was cured with the plate adhered thereto and then the plate was removed. An intermediate layer 16 with the guide groove was thereby formed having a thickness of about 25 μm.

A second information layer 21 was formed on the surface of the intermediate layer 16. The second information layer 21 had a constitution having a reflective layer 17, a first dielectric layer 18, a recording layer 19 and a second dielectric layer 20. An AgPdCu reflective layer 17 having a thickness of 8 nm was firstly formed by the sputtering method using an AgPdCu (weight ratio 98.1:0.9:1.0) target. Next, a ZnO dielectric layer 18 having a thickness of 8 nm was formed by the sputtering method using a ZnO target. Then, the recording layer 19 of the Sb—O—Ge-based material having a thickness of 14 nm was formed by the sputtering method using an Sb—Ge target. Next, a ZnS—SiO$_2$ dielectric layer 20 having a thickness of 20 nm was formed by the sputtering method using a ZnS—SiO$_2$ (molar ratio 80:20) target. An optical transparent layer 22 having a thickness of 75 μm was formed on the surface of this second information layer 21 using the ultraviolet-curable resin (an acrylic resin).

The formation of each layer was conducted using a target having a diameter of 100 mm and a thickness of 6 mm. The power source and the output used in the step of forming each layer were a DC power source and 350 W for the Al—Ni reflective layer, the DC power source and 200 W for the AgPdCu reflective layer, an RF power source and 300 W for the dielectric layer, the RF power source and 100 W for the recording layer. The film formation of the reflective layer was carried out in a gas atmosphere of Ar 25 sccm, keeping the gas pressure at about 0.13 Pa. The film formation of the recording layer was carried out in a mixed-gas atmosphere of Ar 25 sccm and oxygen, keeping the gas pressure at about 0.13 Pa. The film formation of the dielectric layer was carried out in the gas atmosphere of Ar 25 sccm, keeping the gas pressure at about 0.13 Pa.

The method for analyzing the composition of the recording layer and the method for evaluating the C/N ratio and the read stability were as described in relation to Example 1. The evaluation results of the information recording mediums manufactured in Example 3 were arranged in Table 3.

TABLE 3

| Disc | | Composition of Recording Layer [at %] | | | C/N ratio | Reproduction Duration | Comprehensive Evaluation |
|---|---|---|---|---|---|---|---|
| | | Sb | O | Ge | | | |
| 39 | 1st Information Layer | 38 | 42 | 20 | ◉ | ○ | ◉ |
| | 2nd Information Layer | 38 | 42 | 20 | ◉ | ○ | |

As shown in Table 3, it was found that good C/N ratio and good read stability were obtained similarly to Example 1, when the recording layers of the first information layer and the second information layer had a composition of Sb:O:Ge=38:42:20 (at %).

Here, the composition of the Sb—O—Ge recording layer was Sb:O:Ge=38:42:20 (atom %). It was confirmed that the same tendency as that of the monolayer information recording medium manufactured in Example 1 was found when the recording layer had another composition. Further, it was confirmed that the same characteristics were obtained when Zn, Ni, Te, Si, C, In and Cu were used as the element M.

According to this example, it was confirmed that the two-layer information recording medium with good signal quality could be realized by selecting the material wherein the content of the Sb atoms was between 10 atom % and 70 atom %, the content of the O atoms was between 20 atom % and 70 atom %, and the content of the M atoms wherein M is at least one element selected from a group consisting of Ge, Zn, Ni, Te, Si, C, In and Cu was between 1 atom % and 50 atom %, in the recording layer. Further, it was confirmed that the two-layer information recording medium with very good signal quality could be realized by selecting the material wherein the content of the Sb atoms was between 20 atom % and 55 atom %, the content of the O atoms was between 30 atom % and 55 atom %, and the content of the M atoms (wherein M is at least one element selected from a group consisting of Ge, Zn, Ni, Te, Si, C, In and Cu) was between 5 atom % and 35 atom %, as the recording layer.

Example 4

In Example 4, the recording layers of an information recording medium having four information layers were constituted from the Sb—O-M-based material (here, the Sb—O—Ge-based material was used as a representative example) and the effect of the composition of the recording layer on the C/N ratio and the read stability of the recording medium (optical disc) were investigated, similarly to Example 1.

An information recording medium having a layer construction (n=4) shown in FIG. 4 was manufactured. A substrate of a polycarbonate resin was used as a substrate 25. The substrate had a diameter of 12 cm and a thickness of 1.1 mm and a guide groove on one surface. The guide groove had a groove pitch of 0.32 μm and a groove depth of 20 nm.

A first information layer 30 was formed on the surface of the substrate 25 where the groove was formed. The first information layer 30 had a constitution having a reflective layer 26, a first dielectric layer 27, a recording layer 28 and a second dielectric layer 29. An AgPdCu reflective layer 26 having a thickness of 80 nm was firstly formed by the sputtering method using an AgPdCu (weight ratio 98.1:0.9:1.0) target. Next, a ZnO dielectric layer 27 having a thickness of 20 nm was formed by the sputtering method using a ZnO target. Next, the recording layer 28 of the Sb—O—Ge-based material having a thickness of 20 nm was formed by the sputtering method using a target of Sb—Ge. Next, a ZnS—SiO$_2$ dielectric layer 29 having a thickness of 20 nm was formed by the sputtering method using a ZnS—SiO$_2$ (molar ratio 80:20) target.

An ultraviolet-curable resin (an acrylic resin) was applied to the surface of this first information layer by a spin coat method. Next, a plate wherein convexes and concavities complementary to the guide groove formed on the substrate were formed was adhered to the ultraviolet-curable resin. The ultraviolet-curable resin was cured with the plate adhered thereto and then the plate was removed. An intermediate layer 31 with the guide groove was thereby formed having a thickness of about 13.5 μm.

A second information layer 35 was formed on the surface of this intermediate layer 31. The second information layer had a constitution having a first dielectric layer 32, a recording layer 33 and a second dielectric layer 34. An AlN dielectric layer 32 having a thickness of 15 nm was firstly formed by the sputtering method using an AlN target. Next, the recording layer 33 of the Sb—O—Ge-based material having a thickness of 11 nm was formed by the sputtering method using the Sb—Ge target. Next, a ZnS dielectric layer 34 having a thickness of 22 nm was formed by the sputtering method using a ZnS. An intermediate layer 36 having a thickness of 17.5 μm was formed on the surface of this dielectric layer. The intermediate layer 36 was formed in the same manner as the intermediate layer 31.

A third information layer (not shown) was formed on the surface of this intermediate layer. The third information layer had a constitution having a first dielectric layer, a recording layer and a second dielectric layer. An AlN dielectric layer having a thickness of 10 nm was firstly formed by the sputtering method using an AlN target. Next, an Sb—O—Ge recording layer having a thickness of 7 nm was formed by the sputtering target using an Sb—Ge target. Next, a ZnS—SiO$_2$ dielectric layer having a thickness of 34 nm was formed by the sputtering method using a ZnS—SiO$_2$ (molar ratio 80:20) target. An intermediate layer having a thickness of 9.5 μm was formed on the surface of the ZnS—SiO$_2$ dielectric layer. This intermediate layer was formed in the same manner as the intermediate layer 31.

A fourth information layer 40 was formed on the surface of this intermediate layer. The fourth information layer 40 had a constitution having a first dielectric layer 37, a recording layer 38, and a second dielectric layer 39. An AlN dielectric layer 37 having a thickness of 15 nm was formed by the sputtering method using an AlN target. Next, an Sb—O—Ge recording layer 38 having a thickness of 6 nm was formed by the sputtering target using an Sb—Ge target. Next, a ZnS—SiO$_2$ dielectric layer 39 having a thickness of 45 nm was formed by the sputtering method using a ZnS—SiO$_2$ (molar ratio 80:20) target. An optical transparent layer 41 having a thickness of 59.5 μm was formed on the surface of the ZnS—SiO$_2$ dielectric layer 39 using an ultraviolet-curable resin (an acrylic resin). The method for forming the optical transparent layer 41 was the same as that described in Example 1.

The formation of each layer was conducted using a target having a diameter of 100 mm and a thickness of 6 mm. The power source and the output used in the step of forming each layer were a DC power source and 200 W for the reflective layer, an RF power source and 300 W for the first dielectric layer, the RF power source and 100 W for the recording layer. The film formation of the reflective layer was carried out in a gas atmosphere of Ar 25 sccm, keeping the gas pressure at about 0.13 Pa. The film formation of the recording layer was carried out in a mixed-gas atmosphere of Ar 25 sccm and oxygen, keeping the gas pressure at about 0.13 Pa. The film formation of the second dielectric layer was carried out in the gas atmosphere of Ar 25 sccm, keeping the gas pressure at about 0.13 Pa.

The method for analyzing the composition of the recording layer and the method for evaluating the recording sensitivity and the reliability were as described in relation to Example 1. The evaluation results of discs were arranged in Table 4.

TABLE 4

| Disc | | Composition of Recording Layer [at %] | | | C/N ratio | Reproduction Duration | Comprehensive Evaluation |
|---|---|---|---|---|---|---|---|
| | | Sb | O | Ge | | | |
| 40 | 1st Information Layer | 38 | 42 | 20 | ◉ | ○ | ◉ |
| | 2nd Informtaion Layer | 38 | 42 | 20 | ◉ | ○ | |
| | 3rd Information Layer | 38 | 42 | 20 | ◉ | ○ | |
| | 4th Information Layer | 38 | 42 | 20 | ◉ | ○ | |

As shown in Table 4, good c/N ratio and good read stability were obtained similarly to Example 1 when every one of the recording layers of the first to fourth information layers were formed so that they have the composition of Sb:O:Ge=38:42:20 (atom %).

Here the composition of the Sb—O—Ge recording layer was Sb:O:Ge=38:42:20 (atom %). It was confirmed that the same tendency as that of the monolayer information recording medium manufactured in Example 1 was found when the recording layer had another composition. Further, it was confirmed that the same characteristics were obtained when Zn, Ni, Te, Si, C, In and Cu were used as the element M.

According to this example, it was confirmed that the four-layer information recording medium with good signal quality could be realized by selecting the material wherein the content of the Sb atoms was between 10 atom % and 70 atom %, the content of the O atoms was between 20 atom % and 70 atom %, and the content of the M atoms wherein M is at least one element selected from a group consisting of Ge, Zn, Ni, Te, Si, C, In and Cu was between 1 atom % and atom %, in the recording layer. Further, it was confirmed that the four-layer information recording medium with very good signal quality could be realized by selecting the material wherein the content of the Sb atoms was between 20 atom % and 55 atom %, the content of the O atoms was between 30 atom % and 55 atom %, and the content of the M atoms wherein M is at least one element selected from a group consisting of Ge, Zn, Ni, Te, Si, C, In and Cu was between 5 atom % and 35 atom %, as the recording layer.

Example 5

In Example 5, when the Sb—O—Ge-based material was used as the recording material, the effect of the material of the dielectric layer on the C/N ratio of the recording medium (optical disc) was investigated.

The information recording medium having a layer construction shown in FIG. 2 was manufactured. A substrate of a polycarbonate resin was used as a substrate 2. The substrate had a diameter of 12 cm, and a thickness of 1.1 mm, and a guide groove on one surface. The guide groove had a groove pitch of 0.32 μm and a groove depth of 20 nm.

An Al—Ni reflective layer 3 having a thickness of 80 nm was formed on the surface of the substrate where the guide groove was formed by the sputtering method using an Al—Ni (atomic ratio 96.0:4.0) target. Next, a first dielectric layer 4 having a composition shown in Table 5 was formed by the sputtering method. Next, an Sb—O—Ge recording layer 5 (Sb:O:Ge=38:42:20 (atom %)) having a thickness of 20 nm was formed using a target of Sb—Ge. Next a second dielectric layer having a composition shown in Table 5 was formed by the sputtering method. The film forming conditions for each layer and the method for evaluating the disc were described in relation to Example 1. The evaluation results of the discs are shown in Table 5.

TABLE 5

| Disc | First Dielectric Layer | Second Dielectric Layer | C/N ratio |
|---|---|---|---|
| 41 | $Al_2O_3$ | $Al_2O_3$ | ⊚ |
| 42 | ZnO | ZnO | ⊚ |
| 43 | $TiO_2$ | $TiO_2$ | ⊚ |
| 44 | $ZrO_2$ | $ZrO_2$ | ⊚ |
| 45 | $SiO_2$ | $SiO_2$ | ⊚ |
| 46 | $Cr_2O_3$ | $Cr_2O_3$ | ⊚ |
| 47 | $LaF_3$ | $LaF_3$ | ⊚ |
| 48 | $CaF_2$ | $CaF_2$ | ⊚ |
| 49 | AlN | AlN | ⊚ |
| 50 | $Si_3N_4$ | $Si_3N_4$ | ⊚ |
| 51 | $Ge_3N_4$ | $Ge_3N_4$ | ⊚ |
| 52 | ZnS | ZnS | ⊚ |
| 53 | $ZnS\text{—}SiO_2$ | $ZnS\text{—}SiO_2$ | ⊚ |
| 54 | $Sb_2O_3$ | $Sb_2O_3$ | ⊚ |
| 55 | AlN | $ZnS\text{—}SiO_2$ | ⊚ |
| 56 | ZnO | $ZnS\text{—}SiO_2$ | ⊚ |
| 57 | $B_2O_3$ | $B_2O_3$ | X |

As shown in Table 5, good C/N ratio was obtained when using $Al_2O_3$, ZnO, $TiO_2$, $ZrO_2$, $SiO_2$, $Cr_2O_3$, $LaF_3$, $MgF_2$, $CaF_2$, AlN, $Si_3N_4$, $Ge_3N_4$, ZnS, $ZnS\text{—}SiO_2$ (a mixture of ZnS and $SiO_2$), or $Sb_2O_3$ as the materials for the first dielectric layer and the second dielectric layer. The first dielectric layer and the second dielectric layer were formed from the same material in Discs 41-54, and the first dielectric layer and the second dielectric layer were formed from the different materials in Discs 55 and 56. There is no effect on the C/N ratio even when the material of the first dielectric layer is different from the material of the second dielectric layer. Further, it was confirmed that the same results were obtained for combinations of the materials of the first and the second dielectric layers other than those listed above.

Further, good C/N ratio was not obtained when $B_2O_3$ was selected as the material of the first and the second dielectric layers. Since a melting point of $B_2O_3$ was 577° C. and was lower than that of $Sb_2O_3$ (melting point: 656° C.) constituting the recording layer, it is considered that the dielectric layer adjacent to the recording layer melted when the information was recorded by applying laser beam. It is presumed that, as a result, the material of the dielectric layer was mixed into the recording layer, which did not give the sufficient change in reflectance. This showed that the dielectric layer is preferably formed from a material which has a melting point nearly equal to or higher than the melting point of $Sb_2O_3$.

Here an example wherein Ge was used as the element M is described. It was confirmed that the same characteristics were obtained when Zn, Ni, Te, C and Cu were used as the element M.

According to this example, it was confirmed that the information recording medium with good signal quality could be realized by selecting $Al_2O_3$, ZnO, $TiO_2$, $ZrO_2$, $SiO_2$, $Cr_2O_3$, $LaF_3$, $MgF_2$, $CaF_2$, AlN, $Si_3N_4$, $Ge_3N_4$, ZnS, $ZnS\text{—}SiO_2$, or $Sb_2O_3$ as the first dielectric layer and the second dielectric layer.

Example 6

In Example 6, when the Sb—O—Ge-based material was used as the recording material, the effect of the thickness of the recording layer on the C/N ratio of the recording medium (optical disc) was investigated.

The information recording medium having a layer construction shown in FIG. 2 was manufactured. A substrate of a polycarbonate resin was used as substrate 2. The substrate had a diameter of 12 cm, and a thickness of 1.1 mm, and a guide groove on one surface. The guide groove had a groove pitch of 0.32 μm and a groove depth of 20 nm.

An Al—Ni reflective layer 3 having a thickness of 80 nm was formed on the surface of the substrate where the groove was formed by a sputtering method using an Al—Ni (atomic ratio 96.0:4.0) target. Next, a $ZnS\text{—}SiO_2$ dielectric layer 4 was formed using a $ZnS\text{—}SiO_2$ (molar ratio 80:20) target. The thickness of the dielectric layer 4 varied from sample to sample, and was selected so that the reflectance which enables the recording and reproduction to be carried out stably depending on the thickness of the recording layer was ensured and the contrast was maximized. Next, a recording layer of the Sb—O—Ge-based material (Sb:O:Ge=38:42:20 (atom %), thickness varied sample to sample) was formed by the sputtering method using a target of Sb—Ge. Next, an AlN dielectric layer 6 was formed by the sputtering method using an AlN target. The thickness of the dielectric layer 6 varied from sample to sample, and was selected so that the dielectric layer had appropriate refractive index and extinction coefficient depending on the thickness of the recording layer.

The film forming conditions for each layer and the method for evaluating the disc were the same as described in relation to Example 1. The evaluation results of the discs are shown in Table 6.

TABLE 6

| Disc | Thickness of Recording Layer | C/N ratio |
|---|---|---|
| 58 | 1 nm | Δ |
| 59 | 2 nm | ◯ |
| 60 | 5 nm | ◯ |
| 61 | 10 nm | ⊚ |
| 62 | 30 nm | ⊚ |
| 63 | 50 nm | ◯ |
| 64 | 70 nm | ◯ |
| 65 | 80 nm | Δ |

As shown in Table 6, the C/N ratio of the information recording medium of which recording layer was formed from the Sb—O—Ge-based material varies depending on the thicknesses of the recording layers. According to Table 6, the C/N ratio was low when the thickness of the recording layer was less than 2 nm. It is considered that this is because that the recording layer was not continuous layer.

When the thickness of the recording layer was in a range of 2 nm to 70 nm, the recording layer forms the continuous layer and thereby good C/N ratio was obtained. In particular, when the thickness of the recording layer was in a range of 10 nm to 30 nm, most favorable C/N was obtained because sufficient optical change was obtained and the in-plane thermal diffusion was small. When the thickness of the recording layer was over 70 nm, the C/N ratio was reduced due to large in-plane thermal diffusion in the recording layer. Therefore, the thickness of the recording layer is preferably in a range of 2 nm to 70 nm in view of the C/N ratio.

Here an example wherein Ge was used as the element M is described. It was confirmed that the same characteristics were obtained when Zn, Ni, Te, C and Cu were used as the element M.

Further, a suitable thickness of the recording layer of the first information layer was from 2 nm to 70 nm in the information recording medium consisting of two information layers as shown in FIG. 3, similarly to the recording layer of the medium shown in FIG. 2. On the other hand, it was found that the thickness of the recording layer of the second information layer was preferably from 2 nm to 30 nm since the second information layer was required to have high transmittance.

Further, the suitable thickness of the recording layer of the first information layer was from 2 nm to 70 nm in the information recording medium consisting of four information layers as shown in FIG. 4 (n=4), similarly to the recording layer of the medium shown in FIG. 2. On the other hand the suitable thicknesses of the recording layers of the second to the fourth information layers were from 2 nm to 15 nm since these layers were required to have high transmittance.

From this example, the thickness of the recording layer is preferably from 2 nm to 70 nm in the information recording medium consisting of one information layer; and the thickness of the recording layer of the information layer which is positioned back when viewed from the laser entry side is preferably from 2 nm to 70 nm and the thickness of the recording layer of the information layer which is positioned near to the laser entry side is preferably from 2 nm to 30 nm in the information recording medium consisting of two information layers. The thickness of the recording layer of the information layer which is positioned back when viewed from the laser entry side is preferably from 2 nm to 70 nm, and the thicknesses of the recording layers of the three information layers which are positioned near to the laser entry side are preferably from 2 nm to 15 nm in the information recording medium consisting of four information layers. It was confirmed that the thickness of the recording layer in each information layer was in the above-mentioned range, the information recording medium with good signal quality was realized.

Example 7

In Example 7, Discs 6-10 which showed good results in Example 1 (wherein the recording speed was 144 Mbps) were subjected to higher speed recording and the recorded signal was evaluated. The recording speed was 288 Mbps (corresponding to 8x-speed of BD) which was twice the speed employed in Example 1. The method for evaluating the disc was the same as that employed in Example 1, except for the recording speed. The evaluation results of the discs are shown in Table 7.

TABLE 7

| Disc | Composition of Recording Layer (at %) | | | C/N ratio Recording at 144 Mbps | C/N ratio Recording at 288 Mbps |
|---|---|---|---|---|---|
| | Sb | O | Ge | | |
| 6 | 35 | 35 | 30 | ⊚ | ○ |
| 7 | 25 | 45 | 30 | ⊚ | ○ |
| 8 | 38 | 42 | 20 | ⊚ | ⊚ |
| 9 | 50 | 40 | 10 | ⊚ | ⊚ |
| 10 | 40 | 50 | 10 | ⊚ | ⊚ |

As shown in Table 7, the sufficient C/N ratio was obtained at 288 Mbps, similarly to the evaluation results at 144 Mbps. It was, however, found that the C/N ratio of the recording medium having the recording layer containing Ge in an amount of 30 atom % was somewhat reduced. It is presumed that this is because the use of the material of a composition containing a lot of Ge reduces the crystallization rate.

According to this example, it was confirmed that when information was recorded at 288 Mbps on a disc which showed good C/N ratio at 144 Mbps, good C/N ratio was obtained similarly. Further, it was confirmed that the disc having the recording layer wherein the content of Ge was 30 atom % had a lower C/N ratio compared to the disc having the recording layer wherein the content of Ge was from 10 atom to 20 atom %, when the disc was subjected to high speed recording at 288 Mbps.

INDUSTRIAL APPLICABILITY

The information recording medium and the method for producing the same are useful as a DVD-R disc and a BD-R disc which are write-one type information recording mediums and the method for producing the discs.

The invention claimed is:

1. An information recording medium comprising
an information layer on a substrate,
wherein the information layer has a recording layer, on and from which information can be recorded and reproduced by irradiating the recording layer with a laser beam,
wherein the recording layer comprises Sb, O and M,
wherein M is a combination of Ge and at least one element selected from a group consisting of Zn, Ni, Te, C and Cu,
wherein a content of O atoms is 35 atom %, a content of Ge is 10 atom %, a content of the at least one element selected from the group consisting of Zn, Ni, Te, and Cu is 10 atom %, and a content of Sb atoms is 45 atom %, based on the total number of the Sb atoms, the O atoms, and the M atoms contained in the recording layer being 100 atom %,
wherein the recording layer comprises the Sb atoms, the O atoms and the M atoms in an amount of 80 atom % or more in total, and
wherein the recording layer does not contain Au, Pt and Pd.

2. The information recording medium according to claim 1, wherein a thickness of the recording layer is 2 nm or more but not more than 70 nm.

3. The information recording medium according to claim 1, wherein the information layer further comprises a dielectric layer, and
wherein the dielectric layer comprises at least one compound selected from a group consisting of $Al_2O_3$, ZnO, $TiO_2$, $ZrO_2$, $SiO_2$, $Cr_2O_3$, $LaF_3$, $MgF_2$, $CaF_2$, AlN, $Si_3N_4$, $Ge_3N_4$, ZnS and $Sb_2O_3$, and/or a mixture of ZnS and $SiO_2$.

4. The information recording medium according to claim 3, wherein the dielectric layer comprises said at least one compound and/or the mixture of ZnS and $SiO_2$ in an amount of 80 mol % or more, and the sum of compounds and/or atoms constituting the dielectric layer is 100 mol %.

5. The information recording medium according to claim 1, further comprising an additional information layer stacked on the substrate.

6. The information recording medium according to claim 1, which is one for recording information on the information layer with laser beam having a wavelength of 350 nm or more but not more than 500 nm, and reproducing the information recorded on the information layer with laser beam having a wavelength of 350 nm or more but not more than 500 nm.

7. The information recording medium according to claim 1, which enables information recording on the information layer only once.

* * * * *